W. A. TURBAYNE.
GENERATOR REGULATOR.
APPLICATION FILED NOV. 23, 1912. RENEWED NOV. 26, 1917.
1,251,595.
Patented Jan. 1, 1918.
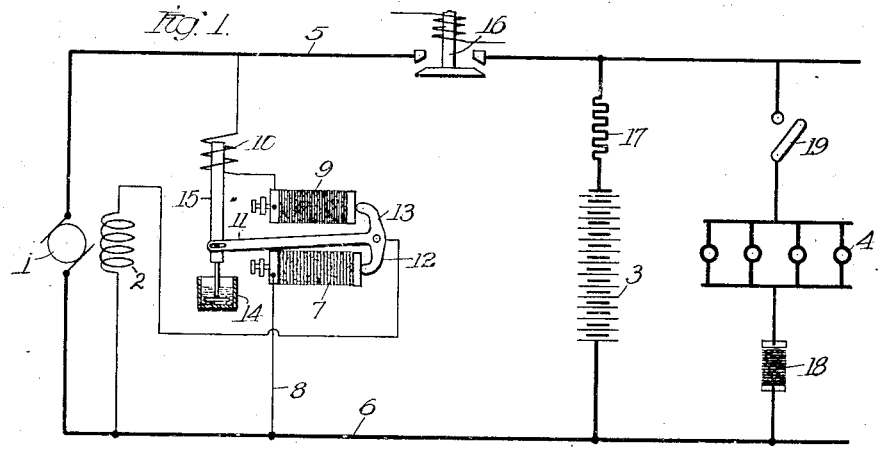
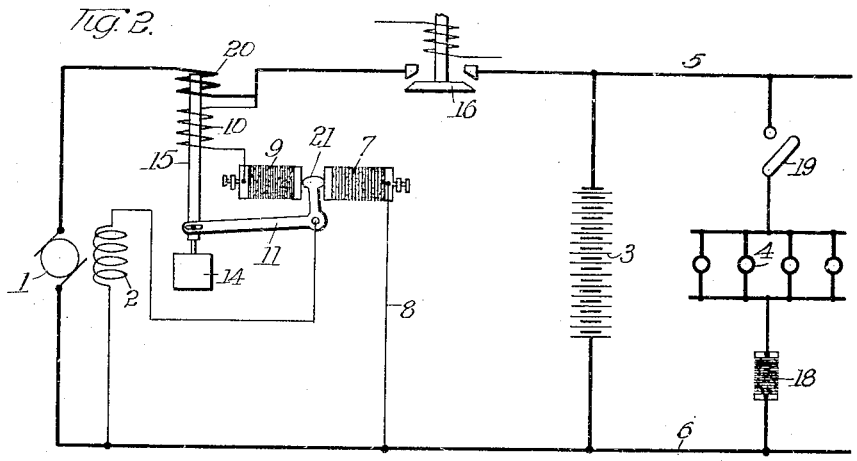
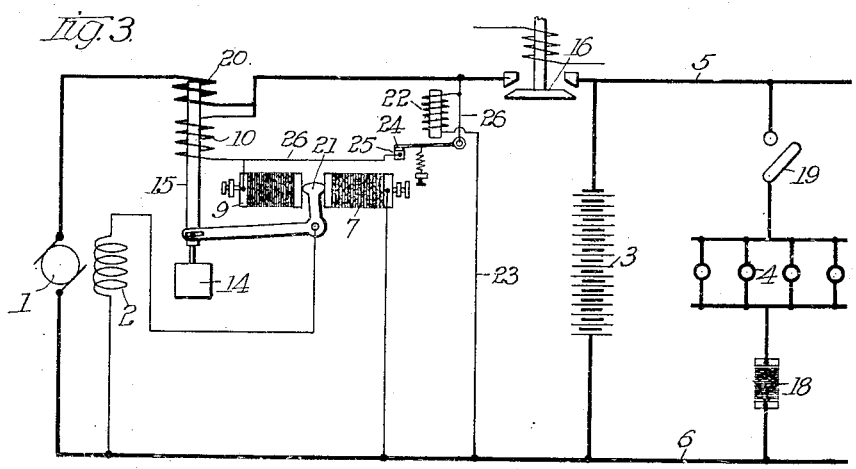
Witnesses:
Robert F. Weir
R. H. Van Nest
Inventor:
William A. Turbayne
Edwin B. H. Tower Atty.

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

GENERATOR-REGULATOR.

1,251,595. Specification of Letters Patent. Patented Jan. 1, 1918.

Application filed November 23, 1912, Serial No. 733,037. Renewed November 26, 1917. Serial No. 204,096.

*To all whom it may concern:*

Be it known that I, WILLIAM A. TURBAYNE, a citizen of the United States, residing at Niagara Falls, in the county of Niagara and State of New York, have invented new and useful Improvements in Generator-Regulators, of which the following is a full, clear, concise, and exact description, reference being had to the accompanying drawing, forming a part of this specification.

This invention relates to an improved generator regulator.

An object of the invention is to provide an improved regulator for variable speed generators which will maintain constant potential under wide ranges of speed.

Another object of the invention is to produce a voltage regulator for a generator in which the controlling coil of the regulator is connected in the generator shunt field circuit.

The accompanying drawings illustrate diagrammatically three systems in which the regulator may be employed.

In Figure 1, a variable speed generator is provided with an armature 1 and a shunt field 2. A battery 3 and lamps or other translating devices 4, are connected in parallel branches across the generator leads 5 and 6. A variable resistance 7, in a circuit 8 in shunt to the generator field and a variable resistance 9 in series with the field and resistance 7, control the field excitation. A solenoid 10, in series with the field winding 2 and shunt circuit 8, controls the variable resistances 7 and 9 through a bell crank lever 11, provided with operating arms 12 and 13. A dash-pot 14 steadies the action of the solenoid core 15.

An automatic switch 16, of any preferred type, connects the generator to the battery and lamps when the generator attains a proper voltage.

A resistance 17 in series with the battery is provided to limit the charging current when the battery counter electromotive force is low.

A variable resistance 18, of any preferred type, may be arranged to maintain constant voltage across the lamp circuit. A switch 19 controls the lamp circuit.

The variable resistances have been illustrated as of the compressible type wherein a number of electrodes in the form of disks of carbon or other material, are arranged to vary the resistance of a circuit by variations in pressure on the electrodes, but it is evident that many other types of variable resistances may be employed.

Starting with the generator at rest, the automatic switch will be open. The solenoid plunger 15 will be in its lowest position, thereby decreasing to a minimum the resistance 9 in series with the field, and increasing to a maximum the resistance 7 in shunt to the field. Upon the generator beginning to operate, its field will rapidly build up and at the proper voltage, the automatic switch will close. When the generator voltage has increased to the predetermined voltage of the system, a sufficient current will flow through the coil 10, causing it to become energized sufficiently to raise its core 15, thereby decreasing pressure on the compressible rheostat 9 and proportionately increasing pressure on the rheostat 7. This will increase the resistance in series with the field and at the same time, divert more current from the field by decreasing the resistance in shunt thereto. The adjustment may be such that a practically constant current will be maintained through the coil 10, the current only departing from constancy sufficiently to effect regulation. The coil 10 will thus act similarly to a coil connected in series with a circuit through which it is desired to maintain a constant current. A constant current through coil 10, in fact, presupposes a constant voltage across the generator, inasmuch as any increase in generator voltage will immediately tend to increase the current in the coil, resulting in a weakening of the field excitation to restore normal conditions. Such conditions will be maintained regardless of speed changes of the generator. The current passing through solenoid 10 will be maintained substantially constant, departing from constancy only sufficiently to effect regulation. Any increase in voltage across the mains 5 and 6 will tend to increase the current through coil 10, causing a weakening of the field excitation to restore normal conditions.

Fig. 2 illustrates a similar system in which, however, a current coil 20 is added, which acts cumulatively with coil 10. The effect of coil 20 is to reduce the generator voltage to limit the current output should the battery 3 be in a depleted state. With this arrangement, the resistance 17 is unnecessary.

A modified arrangement of the compressible rheostats 7 and 9 is illustrated in Fig. 2. The lever 11 is provided with a single operating arm 21, acting between the rheostats in such a manner as to simultaneously increase pressure on one rheostat and decrease pressure on the other. Either form of rheostat-operating means could, of course, be employed in either system.

The systems illustrated in Figs. 1 and 2 both provide a taper charge for the battery.

Fig. 3 illustrates a system in which charging current for the battery will be discontinued at full charge and the battery caused to float across the line. In this system, coil 10 is short-circuited and consequently ineffective as a regulating coil as long as the battery is below a predetermined voltage. A relay 22 is connected across the main line through conductor 23 and controls the short circuit around coil 10 by means of contacts 24, 25 in conductor 26. Coil 20 thus operates to maintain constant current until the voltage has risen to a value above which it is not desirable to charge the battery. At this point relay 22 operates to open the short circuit around coil 10. Coil 10 now predominates in the regulation and brings the generator voltage down to a sufficiently low value to reduce the charging current to zero and permit the battery to float across the line.

In each of the systems illustrated, the voltage regulation of the generator will be maintained regardless of speed changes and regardless of whether the battery circuit is open or otherwise.

In the systems illustrated in Figs. 1 and 2, the generator output will automatically increase to take care of increase in load, due to turning on more lamps or due to the demands of the battery.

In the system illustrated in Fig. 3, constant current will be maintained either in the main circuit or in the battery circuit, depending on the location of coil 20, but after the relay 22 has operated, a constant voltage will be maintained and the output will automatically vary to take care of load conditions.

What I claim as new and desire to secure by Letters Patent is:

1. In combination, a generator provided with a shunt field, a variable resistance in circuit with said shunt field, a variable resistance in shunt to said shunt field, and an operating coil for said variable resistances, said coil connected in series with said first mentioned resistance.

2. In combination with a generator provided with a shunt field, a variable resistance in circuit with said field, a variable resistance in shunt to said field, and means for simultaneously varying said resistances, said means being controlled by a coil in series with said first mentioned resistance.

3. In combination with a generator provided with a shunt field, a variable resistance in circuit with said field, a variable resistance in shunt to said field, a common operating means therefor adapted to increase one of said resistances and simultaneously decrease the other in proportion, said operating means being controlled by a coil in series with said first mentioned resistance.

4. In combination with a generator provided with a shunt field, a variable resistance in the shunt field circuit, a variable resistance in shunt to said field, a coil in series with said shunt field and said circuit in shunt to said field, and means operated by said coil to simultaneously increase said first mentioned resistance and proportionately decrease said second mentioned resistance thereby varying the resistance of said shunt field circuit but maintaining constant the resistance in series with said coil.

5. In combination with a generator provided with a shunt field, a compressible rheostat in circuit with said shunt field, a compressible rheostat in shunt to said shunt field, a bell crank lever simultaneously operating said rheostats, and a coil in series with said first mentioned rheostat for operating said bell crank lever.

6. In combination, a variable speed shunt wound generator, a circuit in shunt to the generator field, a variable resistance in said circuit, a variable resistance in series with the shunt field and circuit in shunt thereto, and an operating coil for said resistances in series with said last mentioned variable resistance.

7. In combination, a variable speed generator, a circuit connected across the terminals of said generator, said circuit including a variable resistance and an operating coil therefor, connected in series, said circuit having parallel branches, one branch including the generator field winding and the other branch including a second variable resistance, said second resistance being varied in proportion to variations in said first resistance.

8. In a regulator for a shunt wound generator, a variable resistance in circuit with the shunt field thereof, a variable resistance in shunt to said field, operating means for said resistances, said operating means being controlled by a coil in series with said first mentioned resistance, assisted by a coil in series with the generator.

9. In combination, a variable speed generator and a circuit across the terminals of said generator, said circuit including a variable resistance and an operating coil therefor, connected in series, said circuit having parallel branches, one branch including the generator field windings and the other branch including a second resistance, said second resistance being varied inversely in proportion to variations in said first resistance.

10. In combination, a variable speed generator and a circuit across the terminals of said generator, said circuit including a variable resistance and an operating coil therefor, connected in series, said circuit having parallel branches, one branch including the generator field windings and the other branch including a second resistance, said second resistance being controlled by said coil.

11. In combination, a variable speed generator and a circuit across the terminals of said generator, said circuit including a variable resistance and an operating coil therefor, connected in series, said circuit having parallel branches, one branch including the generator field windings and the other branch including a second resistance, said second resistance being varied by said coil proportionally to variations in said first resistance and inversely thereto, whereby the aggregate resistance in series with said coil is maintained substantially constant.

12. In combination with a shunt wound generator, a storage battery and lamps supplied thereby, regulating means for the generator, operating means for said regulating means, comprising a coil in series with the generator armature, and a coil in circuit with the shunt field, means normally short circuiting said coil in circuit with the field, and a voltage controlled relay for opening said short circuit.

13. In combination with a shunt wound generator, a compressible rheostat in circuit with the shunt field thereof, a second compressible rheostat in shunt to said field, a common operating means for said rheostats, said operating means being controlled by a coil in series with the generator, and a second coil normally short circuited adapted to assist said series coil on a predetermined voltage rise in the system.

14. In combination with a shunt wound generator, a compressible rheostat in circuit with the shunt field thereof, a second compressible rheostat in shunt to said field, a common operating means for said rheostats, said operating means being controlled by a coil in series with the generator, a second coil normally short circuited, and a voltage responsive relay controlling the short circuit around said second coil, whereby upon a predetermined voltage rise in the system, said second coil may operate said rheostat operating means.

15. In combination with a shunt wound generator, a battery and lamps supplied thereby, regulating means for said generator comprising a compressible rheostat in circuit with the shunt field of said generator, a second compressible rheostat in shunt to said field, a common operating means for said rheostats, a series coil controlling said operating means, a coil in circuit with said shunt field adapted when energized to assist said series coil, a short circuit normally closed around said last mentioned coil, and a relay responsive to battery voltage for controlling said short circuit.

16. In combination, a generator provided with a shunt field winding, a variable resistance in shunt to said winding, and means for maintaining substantially constant the total current flow through said field winding and said resistance.

17. In combination, a generator provided with a shunt field winding, means in circuit therewith tending normally to maintain constant current, and means for diverting a part of said constant current away from said field winding.

18. In combination, a generator provided with a shunt field winding, means in circuit therewith tending normally to maintain constant current, and means controlled by said first mentioned means for diverting a part of said constant current away from said field winding.

19. In combination, a generator provided with a shunt field winding, variable resistance means in shunt to said winding, means in circuit with said winding and said resistance for maintaining substantially constant the current flow therethrough, said last mentioned means including a variable resistance, and means for simultaneously varying said resistances.

In witness whereof, I have hereunto subscribed my name in the presence of two witnesses.

WILLIAM A. TURBAYNE.

Witnesses:
F. J. CALLAHAN,
E. MACVITTIE.

Copies of this patent may be obtained for five cents each, by addressing the "Commissioner of Patents, Washington, D. C."